(12) United States Patent
Storm et al.

(10) Patent No.: US 12,019,703 B2
(45) Date of Patent: *Jun. 25, 2024

(54) SYSTEMS AND METHODS FOR PROVIDING A MARKETPLACE WHERE DATA AND ALGORITHMS CAN BE CHOSEN AND INTERACT VIA ENCRYPTION

(71) Applicant: TripleBlind, Inc., Kansas City, MO (US)

(72) Inventors: Greg Storm, Parkville, MO (US); Riddhiman Das, Parkville, KS (US); Babak Poorebrahim Gilkalaye, Kansas City, MO (US)

(73) Assignee: TRIPLEBLIND HOLDING COMPANY, Kansas City, MO (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/838,776

(22) Filed: Jun. 13, 2022

(65) Prior Publication Data

US 2022/0311750 A1    Sep. 29, 2022

Related U.S. Application Data

(63) Continuation of application No. 16/828,420, filed on Mar. 24, 2020, now Pat. No. 11,363,002.
(Continued)

(51) Int. Cl.
*G06F 17/16* (2006.01)
*G06F 18/2113* (2023.01)
(Continued)

(52) U.S. Cl.
CPC ............. *G06F 17/16* (2013.01); *G06N 3/045* (2023.01); *G06N 3/048* (2023.01);
(Continued)

(58) Field of Classification Search
CPC ............. G06Q 20/1235; G06Q 20/401; G06Q 30/0623; G06Q 2220/00; H04L 9/008;
(Continued)

(56) References Cited

U.S. PATENT DOCUMENTS

| 1,045,208 A | 11/1912 | Spencer |
| 5,410,696 A | 4/1995 | Seki et al. |

(Continued)

FOREIGN PATENT DOCUMENTS

| WO | WO 2021/119365 | 6/2021 |
| WO | WO 2021/119367 | 6/2021 |

OTHER PUBLICATIONS

Ads et al., "Multi-limb Split Learning for Tumor Classification on Vertically Distributed Data", Date of Conference: Dec. 5-7, 2021, IEEE (Year: 2021).

(Continued)

*Primary Examiner* — Mohammad A. Nilforoush
*Assistant Examiner* — Wodajo Getachew

(57) ABSTRACT

A method includes receiving, on a computer-implemented system and from user, an identification of data and an identification of an algorithm and, based on a user interaction with the computer-implemented system comprising a one-click interaction or a two-click interaction. Without further user input, the method includes dividing the data into a data first subset and a data second subset, dividing the algorithm (or a Boolean logic gate representation of the algorithm) into an algorithm first subset and an algorithm second subset, running, on the computer-implemented system at a first location, the data first subset with the algorithm first subset to yield a first partial result, running, on the computer-implemented system at a second location separate from the first location, the data second subset with the algorithm second subset to yield a second partial result and (Continued)

outputting a combined result based on the first partial result and the second partial result.

17 Claims, 8 Drawing Sheets

Related U.S. Application Data

(60) Provisional application No. 62/948,105, filed on Dec. 13, 2019.

(51) Int. Cl.
| | | |
|---|---|---|
| *G06N 3/04* | (2023.01) | |
| *G06N 3/045* | (2023.01) | |
| *G06N 3/048* | (2023.01) | |
| *G06Q 20/12* | (2012.01) | |
| *G06Q 20/40* | (2012.01) | |
| *G06Q 30/0601* | (2023.01) | |
| *G06V 10/82* | (2022.01) | |
| *H04L 9/06* | (2006.01) | |
| *H04L 9/40* | (2022.01) | |
| *G06F 18/24* | (2023.01) | |
| *G06F 18/2413* | (2023.01) | |
| *G06N 3/082* | (2023.01) | |
| *G06N 3/084* | (2023.01) | |
| *G06V 10/44* | (2022.01) | |
| *G06V 10/764* | (2022.01) | |
| *H04L 9/00* | (2022.01) | |
| *H04L 9/08* | (2006.01) | |

(52) U.S. Cl.
CPC ....... *G06Q 30/0623* (2013.01); *H04L 9/0625* (2013.01); *H04L 63/0428* (2013.01); *G06F 18/2113* (2023.01); *G06F 18/24* (2023.01); *G06N 3/04* (2013.01); *G06N 3/082* (2013.01); *G06N 3/084* (2013.01); *G06Q 20/401* (2013.01); *G06Q 2220/00* (2013.01); *G06V 10/454* (2022.01); *G06V 10/764* (2022.01); *G06V 10/82* (2022.01); *H04L 9/008* (2013.01); *H04L 9/085* (2013.01); *H04L 2209/46* (2013.01)

(58) Field of Classification Search
CPC ............... H04L 9/0625; H04L 63/0428; H04L 2209/46; G06V 10/454; G06V 10/82; G06V 10/764; G06F 17/16; G06F 18/24; G06F 18/24133; G06F 18/2113; G06N 3/04; G06N 3/082
USPC .......................................................... 705/75
See application file for complete search history.

(56) References Cited

U.S. PATENT DOCUMENTS

| | | | |
|---|---|---|---|
| 6,353,816 | B1 | 3/2002 | Tsukimoto |
| 6,668,325 | B1 | 12/2003 | Collberg |
| 9,464,043 | B2 | 10/2016 | Roberge et al. |
| 9,646,043 | B1 | 5/2017 | Aronvich |
| 10,002,029 | B1 | 6/2018 | Bequet |
| 10,311,372 | B1 | 6/2019 | Hotchkies |
| 10,360,220 | B1 | 7/2019 | Gupta |
| 10,362,001 | B2 | 7/2019 | Yan |
| 10,419,360 | B2 | 9/2019 | Dawson |
| 10,592,012 | B2 | 1/2020 | Dawson |
| 10,560,872 | B2 | 2/2020 | Dawson |
| 10,594,623 | B2 | 3/2020 | Dawson |
| 10,623,998 | B2 | 4/2020 | Dawson |
| 10,833,871 | B2 | 11/2020 | Ranellucci |
| 10,902,302 | B2 | 1/2021 | Fu |
| 10,924,460 | B2 | 2/2021 | Storm |
| 11,195,099 | B2 | 12/2021 | Luo |
| 11,316,676 | B2 | 4/2022 | Kinjo |
| 2003/0009482 | A1 | 1/2003 | Benerjee |
| 2006/0233377 | A1 | 10/2006 | Chang |
| 2007/0192864 | A1 | 8/2007 | Bryant |
| 2008/0082636 | A1 | 4/2008 | Hofmann |
| 2008/0201721 | A1 | 8/2008 | Little |
| 2009/0063485 | A1 | 3/2009 | Schneider |
| 2010/0100864 | A1 | 4/2010 | Plants |
| 2010/0281254 | A1 | 11/2010 | Carro |
| 2011/0161091 | A1* | 6/2011 | Freishtat ................ G06Q 30/02 705/1.1 |
| 2012/0047097 | A1 | 2/2012 | Sengupta et al. |
| 2013/0124491 | A1 | 5/2013 | Pepper |
| 2013/0272377 | A1 | 10/2013 | Karczewicz |
| 2014/0108813 | A1 | 4/2014 | Pauker |
| 2014/0371902 | A1 | 12/2014 | McClelland |
| 2015/0089243 | A1 | 3/2015 | Veugen |
| 2015/0156204 | A1 | 6/2015 | Resch |
| 2015/0242136 | A1 | 8/2015 | Lin |
| 2015/0288662 | A1 | 10/2015 | Bilogrevic |
| 2015/0371132 | A1 | 12/2015 | Gemello |
| 2016/0103901 | A1 | 4/2016 | Kadav |
| 2016/0156595 | A1 | 6/2016 | Wu |
| 2016/0205095 | A1 | 7/2016 | Morel |
| 2016/0294550 | A1 | 10/2016 | French |
| 2016/0335440 | A1 | 11/2016 | Clark |
| 2016/0342608 | A1 | 11/2016 | Burshteyn |
| 2017/0026342 | A1 | 1/2017 | Sidana |
| 2017/0116520 | A1 | 4/2017 | Min |
| 2017/0149796 | A1 | 5/2017 | Gvili |
| 2017/0228547 | A1 | 8/2017 | Smith |
| 2017/0323196 | A1* | 11/2017 | Gibson ..................... G06F 7/00 |
| 2017/0359321 | A1 | 12/2017 | Rindal |
| 2017/0372201 | A1 | 12/2017 | Gupta |
| 2018/0039884 | A1* | 2/2018 | Dalton ................... G06N 3/063 |
| 2018/0041477 | A1 | 2/2018 | Shaposhnik |
| 2018/0129900 | A1 | 5/2018 | Kiraly |
| 2018/0157972 | A1 | 6/2018 | Hu |
| 2018/0205707 | A1 | 7/2018 | Bellala |
| 2018/0212770 | A1 | 7/2018 | Costa |
| 2018/0227296 | A1 | 8/2018 | Joshi |
| 2018/0330237 | A1* | 11/2018 | Yoshiyama ............ G06N 3/045 |
| 2018/0367509 | A1 | 12/2018 | O'Hare |
| 2019/0005399 | A1 | 1/2019 | Noguchi |
| 2019/0050204 | A1 | 2/2019 | Hutter |
| 2019/0073580 | A1 | 3/2019 | Dzhulgakov |
| 2019/0073586 | A1 | 3/2019 | Chen |
| 2019/0073590 | A1 | 3/2019 | Wu |
| 2019/0114511 | A1 | 4/2019 | Gao et al. |
| 2019/0130265 | A1 | 5/2019 | Ling |
| 2019/0208417 | A1 | 7/2019 | Kang |
| 2019/0228299 | A1 | 7/2019 | Chandran |
| 2019/0286973 | A1 | 9/2019 | Kovvuri |
| 2019/0294805 | A1 | 9/2019 | Taylor |
| 2019/0312772 | A1 | 10/2019 | Zhao |
| 2019/0318421 | A1 | 10/2019 | Lyonnet |
| 2019/0332944 | A1 | 10/2019 | Bai |
| 2019/0372760 | A1 | 12/2019 | Zheng |
| 2020/0036510 | A1* | 1/2020 | Gomez ................... H04L 9/008 |
| 2020/0044862 | A1 | 2/2020 | Yadlin |
| 2020/0104670 | A1 | 4/2020 | Seo |
| 2020/0125933 | A1 | 4/2020 | Aldea Lopez |
| 2020/0158745 | A1 | 5/2020 | Tian |
| 2020/0167127 | A1 | 5/2020 | Lokappa |
| 2020/0167834 | A1 | 5/2020 | Matsuoka |
| 2020/0184044 | A1 | 6/2020 | Zatloukal |
| 2020/0186528 | A1 | 6/2020 | Fan |
| 2020/0193279 | A1 | 6/2020 | Hostetler |
| 2020/0202184 | A1 | 6/2020 | Shrestha |
| 2020/0226284 | A1 | 7/2020 | Yin et al. |
| 2020/0228313 | A1 | 7/2020 | Storm |
| 2020/0242492 | A1 | 7/2020 | Goel |
| 2020/0265301 | A1 | 8/2020 | Burger |
| 2020/0286145 | A1 | 9/2020 | Storm |
| 2020/0296128 | A1 | 9/2020 | Wentz |
| 2020/0304293 | A1 | 9/2020 | Gama |
| 2020/0322141 | A1 | 10/2020 | Kinjo |

(56) References Cited

U.S. PATENT DOCUMENTS

| | | |
|---|---|---|
| 2020/0342288 A1 | 10/2020 | Xi |
| 2020/0342394 A1 | 10/2020 | Moore et al. |
| 2020/0358599 A1 | 11/2020 | Baracaldo Angel |
| 2020/0364608 A1 | 11/2020 | Anwar |
| 2020/0372360 A1 | 11/2020 | Vu |
| 2020/0387797 A1 | 12/2020 | Ryan et al. |
| 2020/0394316 A1 | 12/2020 | Boehler |
| 2020/0402625 A1 | 12/2020 | Aravamudan |
| 2021/0019605 A1 | 1/2021 | Rouhani |
| 2021/0026860 A1 | 1/2021 | Wang |
| 2021/0035330 A1 | 2/2021 | Xie |
| 2021/0064760 A1 | 3/2021 | Sharma |
| 2021/0073036 A1 | 3/2021 | Kim |
| 2021/0089878 A1 | 3/2021 | Greenwald |
| 2021/0117578 A1 | 4/2021 | Cheruvu |
| 2021/0142177 A1 | 5/2021 | Mallya |
| 2021/0150024 A1 | 5/2021 | Zhang |
| 2021/0157912 A1 | 5/2021 | Kruthiveti Subrahmanyeswara Sai |
| 2021/0192279 A1 | 6/2021 | Laaksonen et al. |
| 2021/0194668 A1 | 6/2021 | Masters |
| 2021/0209247 A1 | 7/2021 | Mohassel |
| 2021/0209514 A1 | 7/2021 | Kim et al. |
| 2021/0248268 A1 | 8/2021 | Ardhanari |
| 2021/0264271 A1 | 8/2021 | Gebre |
| 2021/0266170 A1 | 8/2021 | Rossi |
| 2021/0314140 A1 | 10/2021 | Stephenson |
| 2021/0334621 A1 | 10/2021 | Shimizu |
| 2021/0350357 A1 | 11/2021 | Lafontaine |
| 2021/0357859 A1 | 11/2021 | Malvankar |
| 2021/0374502 A1 | 12/2021 | Roth |
| 2021/0385069 A1 | 12/2021 | Reid |
| 2021/0406386 A1 | 12/2021 | Ortiz |
| 2021/0406406 A1 | 12/2021 | Hutter |
| 2022/0004654 A1 | 1/2022 | Patel |
| 2022/0012672 A1 | 1/2022 | Inman |
| 2022/0038271 A1 | 2/2022 | Ranellucci |
| 2022/0050921 A1 | 2/2022 | LaFever |
| 2022/0051276 A1 | 2/2022 | Zelocchi |
| 2022/0108026 A1 | 4/2022 | Ortiz |
| 2022/0121731 A1 | 4/2022 | Growth |
| 2022/0247548 A1 | 8/2022 | Boehler |
| 2022/0351039 A1 | 11/2022 | Satheesh Kumar |

OTHER PUBLICATIONS

Lui et al., "Federated Forest", Arxiv.org, Cornell University Library, May 24, 2019, XP081662771, DOI: 10.1109/TBDATA.2020.2992755, Sections 3, 4, 5; Figure 1. (Year: 2019).

Brisimi et al. "Federated learning of predictive models from federated electronic health records", International Journal of Medical Informatics, Apr. 2018, retrieved on Jan. 18, 2021 from http://www.ncbi.nlm.nih/gov/pmc/articles/PMC5836813/pdf/nihms936798.pdf.

Thapa et al., "SplitFed: When Federated Learning Meets Split Learning", Cornell University Library/Computer Science/Machine Learning, Apr. 25, 2020, [online] [retrieved on Dec. 15, 2021] Retrieved from the Internet URL:arXiv:2004, 12088v, entire document.

Abedi, Ali, and Shehroz S. Khan. "FedSL: Federated Split Learning on Distributed Sequential Data in Recurrent Neural Networks", arXiv preprint arXiv:2011.03180 (Year 2021).

Nir Bitansky et al., "Post-quantum Zero Knowledge in Constant Rounds"; Jun. 2020; 48 pages (Year 2020).

Chandiramani, et al., "Performance Analysis and Distributed and Federated Learning Models on Private Data", Procedia Computer Science, 165(2019), pp. 349-355. (Year: 2019).

\* cited by examiner

SYSTEMS AND METHODS FOR PROVIDING A MARKETPLACE WHERE DATA AND ALGORITHMS CAN BE CHOSEN AND INTERACT VIA ENCRYPTION

CROSS-REFERENCE TO RELATED APPLICATION

The present application is a continuation of U.S. patent application Ser. No. 16/828,420, filed Mar. 24, 2020, which claims priority to U.S. Application No. 62/948,105 filed Dec. 13, 2019, entitled "Systems and Methods for Encryption", the disclosures of which are hereby incorporated herein by reference.

RELATED APPLICATIONS

The present disclosure is related to application Ser. No. 16/828,085, application Ser. No. 16/828,216 and Ser. No. 16/828,354 (213-0102) each filed on Mar. 24, 2020, and each of which is incorporated herein by reference.

TECHNICAL FIELD

The present disclosure generally relates to encryption and more specifically to enable a computing system where encrypted data and encrypted algorithms can interact in an encrypted environment in privacy to produce an output and a marketplace for providing access to the services associated in an easy and efficient manner for users.

INTRODUCTION

There are existing platforms in which users can access products or services beyond purchasing physical items. For example, Amazon provides the "Amazon Web Services" platform in which users can purchase data such as data related to insurance statistics, oncology respiratory disease registry data, consumer data insights, data on sociodemographics for a particular geographic region, and so forth. See aws.amazon.com/marketplace. Furthermore, Amazon also provides an algorithm platform. See aws.amazon.com/marketplace/, machine learning search option. Other marketplaces exist as well for accessing both data and algorithms. Users can use or purchase data as well as use or access algorithms to operate on that data through the use of these various marketplaces.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
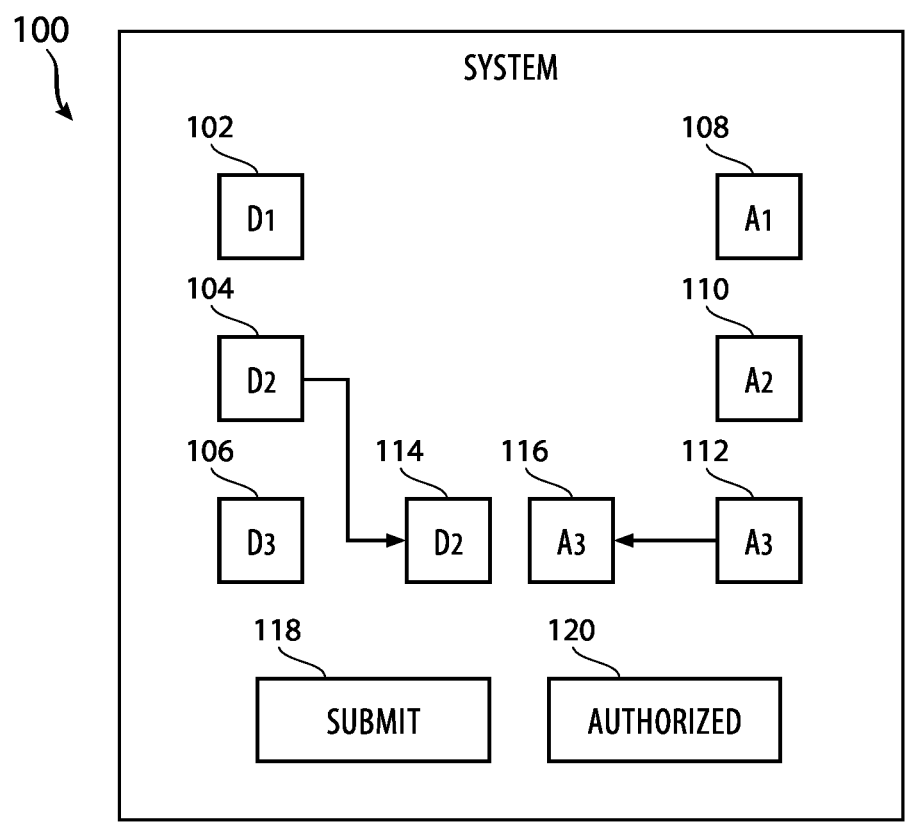
FIG. 1 illustrates an example system for selecting data and an algorithm for processing.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

OVERVIEW

What is needed in the above-described marketplaces is the ability to enable data and algorithms to interact in a secure, encrypted manner. What is disclosed herein is a new computing system that processes data using algorithms in a new way in which both the data and the algorithms are each split, separately encrypted, and processed in a novel way such that there is a separation between the data and the algorithms. The concepts disclosed herein include homomorphically encrypted datasets as well. Only an intended recipient will see the result. The approach enables a safe environment in which neither the party associated with the data nor the party associated with the algorithm knows anything of each other while the data is processed by the algorithm. With the system configured to output encrypted data intended only for the identified recipient, the entire approach of processing the data and generating and delivering the output can be secure in a manner not previously experienced in the existing platforms. Further, this application focuses on an improved user experience when interacting with a marketplace in which data and algorithms are identified such that the algorithms process the data in a secure and private manner as disclosed herein.

An example method includes the following steps in which products are described. The products can be data, algorithms or other computer-based items. The method can include one or more of receiving, on a computer-implemented system and from a first provider of a first product, a request for a second product from a second provider, receiving, on the computer-implemented system, an authorization to use the second product from the second provider. Based on the authorization, the method can include dividing the first product into a first product first subset and a first product second subset, dividing the second product into a second product first subset and a second product second subset, running, on the computer-implemented system at a first location, the first product first subset with the second product first subset to yield a first partial result, running, on the product computer-implemented system at a second location separate from the first location, the first product second subset with the second product second subset to yield a second partial result and outputting a combined result based on the first partial result and the second partial result. These one or more steps can occur in any order.

In another aspect, the method can apply to data that is homomorphically encrypted and manipulated by a standard (unencrypted) algorithm. In this scenario, the data and the algorithm can be securely executed within a trusted execution environment or secure enclave. Examples of secure enclaves can be, hardware-based environments like Qualcomm TZ, Intel SGX, etc., or a software emulated environment like V-Key's V-OS.

The authorization can be a "one-click" or a "two-click" authorization which can take a number of different forms. For example, the system may utilize an object like a button that the user interacts with, biometric input such as a fingerprint, palm-print, or face scan as authorization for processing the chosen data and chosen algorithm according to the principles disclosed herein. An object such as a drop-down menu, button, or other object can be interacted with such as via a click or via a touch sensitive screen to authorize the further processing.

The method of can further include establishing, based on the authorization, a contract between the first provider and the second provider. This can be done, for example, via a computing system, blockchain network including a plurality of distributed nodes running a distributed consensus algorithm for determining when appropriate steps have occurred and recording transactions on a distributed ledger. In one aspect, the first product can be data and the second product can be an algorithm. While this application includes a commercial or marketplace framework component, the principles disclosed herein are also directed to the technical improvements regarding how to enable an algorithm to process data in a private manner such that a party associated with the algorithm does not have access to the data and the party associated with the data does not have insight or access to the algorithm. The approach disclosed herein is focused on the technical processes in order to facilitate this approach.

In another aspect, the authorization can be achieved via public-key cryptography. For example, the authorization can use a Diffie-Hellman type of key exchange protocol or other exchange protocol.

The method of can further include designating an intended recipient of the combined result and/or only providing the combined result to the intended recipient. The person ordering the use of the algorithm with their data can, for example, be designated by the system as the only recipient. Both parties could also receive the data or metadata about the combined results. The combined result can be encrypted and only decrypted by the intended recipient(s). In another aspect, the system can produce an answer "in the clear" without encryption.

In one aspect, upon the outputting of the combined result, a payment is processed from a recipient of the combined result to one of the first provider or the second provider. In this regard, the system can provide a computer implemented marketplace for users to upload algorithms, data, or other products for use in the marketplace in a manner that is secure. The payment can occur at any time through the process such as at the beginning when the authorization is provided to process the data with the algorithm, or at the completion of the process and upon the generation of the results. A cost could also depend on a quality of service component such as timing requirements, security requirements, privacy requirements and so forth. For example, a virtual compute environment have a large amount of compute resources may cost more than a compute environment with less resources which might take more time.

In one aspect, the first location can be separate from the second location such that there is at least one of a physical computer-based separation or a virtual environment separation for distributing the processing of the different locations across a plurality of nodes on a network. The system can implement a secure separation between end nodes such that the first location cannot access the processing or data from the second location and vice versa. The system may also virtualize different computing environments through virtual machines, containers, or any other implementations that enables separate processing environments to be created in a secure manner that they are unable to access the other environments.

The method can also include binarizing the algorithm to produce a binary logic gate set (or a first product set) representing the algorithm, then converting a first product first subset of the first product set into a first Boolean logic gate set and/or converting the second product first subset of the first product set into a second Boolean logic gate set. The first Boolean logic gate set and the second Boolean logic gate set can include at least one of AND gates and/or XOR gates.

One aspect of the disclosure can also include sending the combined result to the first provider and displaying a representation of the combined result or sending the combined result to the second provider and displaying a representation of the combined result.

In this manner, the system can provide an environment in which the user can select a first product such as data and request processing the data via a second product such as an algorithm. The system can present the party owning the algorithm with the request for authorization to use of the algorithm, and then upon the proper authorization, implement the steps described herein for processing the selected data using the selected algorithm in the encrypted environment. The system can be called, in one example, encrypted marketplace which enables a quick and easy user interface for identifying the first product and the second product, obtaining the proper authorizations, initiating the processing of the first product using the second product in a "one-click" purchase context. The process can take several interactions and may or may not purely be "one-click" based on when one starts counting clicks or interactions. However, the concepts disclosed will focused on improved mechanisms for simplifying the user interaction to enable, for example, data to be processed by a selected algorithm in a manner that is more efficient for the user.

It is noted that there does not have to be a one-to-one relationship between the first product (i.e., an algorithm) and the second product (i.e., data). An algorithm may use two or more datasets from the marketplace. Two or more algorithms can be strung together to operate upon two or more datasets as well.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Disclosed herein is a new system, a platform, compute environment, cloud environment, marketplace, or any other characterization of the system that will enable a simplified approach to selecting data to be processed and selecting an algorithm to be processed, obtained a proper authorization(s), initiate the processing of the data by the algorithm in one or two clicks, or other simplified authorization approach. For example, a single function gesture with a user's hand or other motion, or biometric authorization, could be the "one-click". Bringing a user's mobile device near a station having a near field communication (NFC) component can initiate the processing, with our without a biometric authorization or any other action. Generally, the system in it physical structure be similar to an Amazon Web Services environment or a Google Cloud Platform. The system generally include a plurality of computing nodes to handle the processing needs, processors, memory, computer busses, communication components to enable the system to be accessible via a network such as the Internet. Disclosed herein is an improvement to such a system in a manner in which encrypted data is processed by an encryption algorithm to produce encrypted output such that the data of a first provider selecting or providing the data cannot gain access to a second provider of the algorithms authorized for use by the second provider.

For example, in one aspect, a first provider or user could upload data to the system and in a single click, single function or action could select an algorithm and initiate the processing of the chosen data with the algorithm. Once the data and algorithm are identified, the system would be in a state that is ready for authorization to process the data with the identified algorithm. Without any other interaction after a single click or single function action by the user, the system could begin to process the data using algorithm according to the concepts disclosed herein. In one aspect, a payment could concurrently be processed as authorized by the same function. Thus, the single click (or similar action) could begin the processing of the data by the algorithm and begin a processing of a payment which can be one time or recurring.

In one aspect, a second provider who controls the algorithm may receive a request to use the algorithm and provide authorization or permission for the algorithm to be used. This authorization can be manual or can be automated such that an authorization provided given a certain conditions. The conditions may be related to a reputation of the first provider, an establishment of a credit rating which provides confidence that the second provider will be paid for use of the algorithm, other security measures based on a previous history of the first provider, and so forth. A number of factors can come into play with respect to how the authorization is provided by the second provider.

The authorization can be achieved via public-key cryptography. For example, the authorization can use a Diffie-Hellman type of key exchange protocol or other exchange protocol in the authorization process.

FIG. 1 illustrates a system 100 which includes three different sets of data D1 102, D2 104 and D3 106. Different available algorithms for selection are also shown A1 108, A2 110, and A3 112. The system is provided by way of example and the system could have many more options available for selection. Again, in one aspect, a first provider can select available products (data) to be processed or can upload their own data. Various user interfaces could be presented to the first provider which enable them to choose by buttons, links, drop-down menus, multimodal commands, voice input, gesture input, use of a touch-sensitive display and so forth, to either select a first product or upload the first product. It is noted that in this disclosure that products are discussed which are meant to broadly cover the potential various entities or items which can be used within the system 100. For example, a product can be data, an algorithm, software, an operating system, a computer game, a database, an application programming interface, and so forth. Generally speaking, when a first product is selected and the second product is selected, the first product and the second product will interact in some manner within the system according to the principles disclosed herein related to processing based on the first product and the second product in a context of privacy between the products.

In one aspect, FIG. 1 can illustrate a basic marketplace where data can be selected, purchased, provided or otherwise made available to a chosen algorithm. The algorithm can also be purchase, leased, uploaded or otherwise made available. A "shopping cart" model could also be used. The different would be that the user does not just put items for sale in the virtual shopping cart, but the user completes a shopping cart by selecting data to put into the shopping cart and then an algorithm to put in the shopping cart. Two different products that are needed to interact with one another are placed in the shopping cart for processing, payment, or other actions.

Assume that the first provider selects the first product as D2 104 and selects or requests the second product A3 112. Feature 100 could represent a display or user interface that enables the first provider to drag and drop the selected products or can represent the underlying processing that occurs when the first product and the second product are selected. The selected first product D2 114 and the selected second product A3 116 will be ready for processing typically when the second provider authorizes the use of the second product A3 116. The first product can be retrieved by the first provider from a database or a plurality of first products to select from. The provider of the second product can also preauthorize the use of the second product in general by providing the second product to the marketplace or based on some criteria associated with the user or requestor who wants to use the second product.

Feature 100 shows an indication 120 that the use of the second product A3 116 is authorized. The user interface for the first provider may or may not show the request for permission or authorization process to the second provider. In one aspect, the second provider would receive a notification or a request to authorize the use of the second product A3 116 which authorization can be provided in an automated fashion assuming proper conditions are met. The parties may even negotiate a price, a quality of service, a timing element, a data output configuration, and so forth, as optional features. For example, the process can be also implemented via an auction for use of an algorithm for particular data.

Assuming that the proper authorization has been provided, the first provider may optionally interact with a "submit" object 118 to start the processing. However, as noted above, it is contemplated that a simplified "one-click" approach can occur in which the first provider only need to identify the first product D2 114 and the second product A3

116 without any other user interaction needed to initiate the processing and to obtain the results. Thus, it is contemplated that there may be as little as one interaction by the first provider or the system may require two or more interactions such as a request for the first product D2 114 and the second product A3 116, as well as an interaction to submit 118 the first product D2 114 and the second product A3 116 for processing.

As noted above, the interactions described herein can be a physical interaction via a computer screen via a mouse, interaction with a touch sensitive screen, a voice command, a spoken dialogue, a gesture, a fingerprint or palm print, facial recognition, a speaker verification, an NFC communication or wireless link, or any combination of interactions. For example, the user may click on an object associated with the first product and the second product and speak a voice command to submit for processing. The products can be identified as well through a spoken dialog component such as a Siri or Alexa wherein the user could, through a dialog, request data and an algorithm and authorize the initiation of processing.

Determining when to start counting clicks can be relevant. For example, the user may interact with the system 100 to arrive at a state where data is identified as well as the algorithm. Amazon.com made the "one-click" purchasing feature famous. The difference in the present disclosure relative to Amazon.com is that with Amazon.com, the counting of "clicks" starts when a product is identified that a user wants to purchase. In this disclosure, the context requires not just the purchasing of a physical product, but rather the identification of two products that must interact according to the principles disclosed herein. Thus, the counting of "clicks" in this case would start after the first product is identified as well as the second product. It could start after the first product is identified with the next click or interaction being multipurpose in choosing the second product, making a payment, initiating a payment process, and/or determining or identifying an output recipient.

Additionally, the actions that occur upon the user providing the "one-click" interaction differ from an Amazon.com scenario where the method, upon a one-click authorization, implements the steps of dividing a first product into a first product first subset and a first product second subset, dividing a second product into a second product first subset and a second product second subset, running, on a computer-implemented system at a first location, the first product first subset with the second product first subset to yield a first partial result, running, on the product computer-implemented system at a second location separate from the first location, the first product second subset with the second product second subset to yield a second partial result and outputting a combined result based on the first partial result and the second partial result. The combined result can be encrypted or in other scenarios, not encrypted.

The authorization can be a "one-click" or a "two-click" authorization which can take a number of different forms. For example, the system may utilize biometric input such as a fingerprint, palm-print, or face scan as authorization for processing the chosen data and chosen algorithm according to the principles disclosed herein. The one-click operation can cause a number of different actions to be performed. For example, interacting with the authorize button 120 can cause (1) a payment to be made using any approach such as an Amazon.com approach, Apple Pay, Google Pay, cryptocurrency, or any type of payment and (2) initiate the processing disclosed herein and in the incorporated patent applications to obtain a final result of the chosen algorithm operating on the chosen data. An object such as a drop-down menu, button, or other object can be interacted with such as via a click or via a touch sensitive screen to authorize the further processing. The authorizing can also be done via a point of sale device using a smart phone via a wireless link between a device and the smart phone to exchange information and cause a payment to be made and concurrently to initiate the processing of the data via the algorithm.

The simplification of the approach can be accomplished through storing and then accessing user profile data such as payment data, recipient data, contact information, data/algorithm preferences, quality of service requirements, and so forth at an aggregator, marketplace or any other entity involved in the process. In another aspect, application programming interfaces can be developed to pass necessary data to an aggregator or to a marketplace system such that the user only needs a simple interaction.

Figure 2:
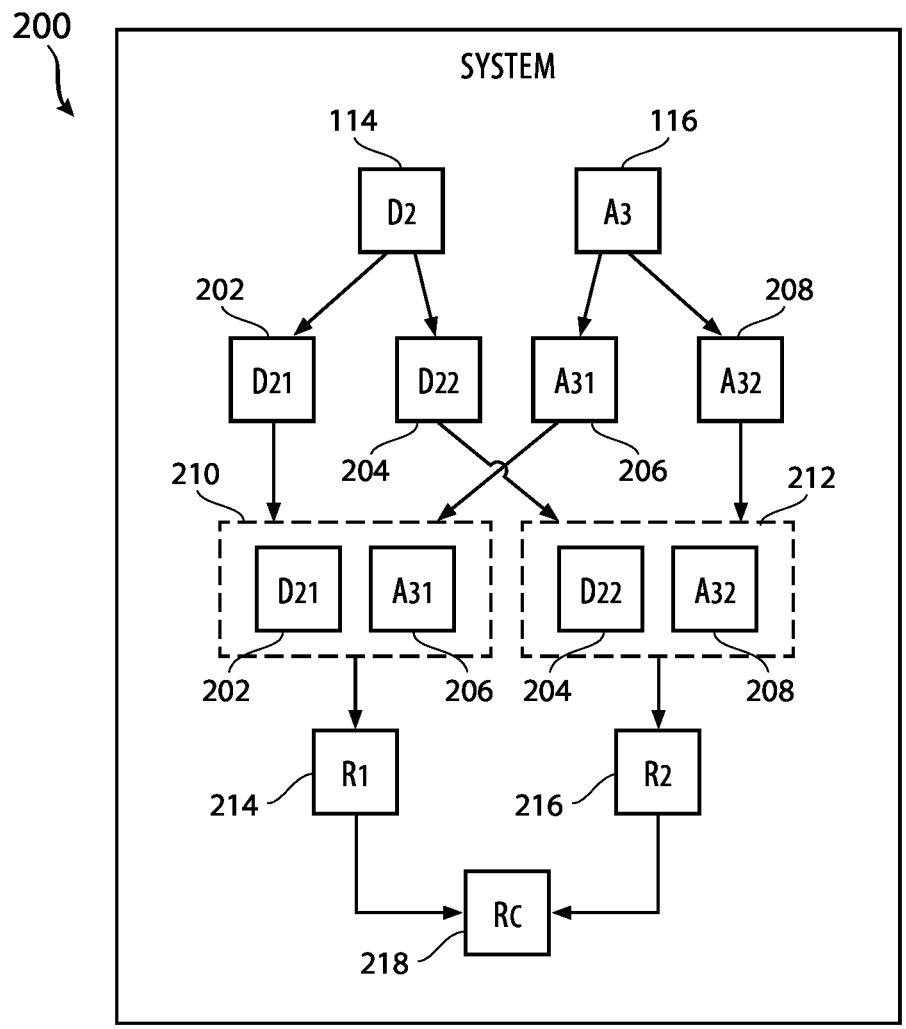
FIG. 2 illustrates at a high level the splitting of the data and the splitting of the algorithm for secure processing.

FIG. 2 illustrates a higher-level the steps that occur during the processing of the first product D2 114 with the second product A3 116. The technologies herein provide a system and/or process for hiding or encrypting any algorithm from the data the algorithm operates on, in a way that the data owner does not learn anything meaningful about the algorithm and the algorithm owner does not learn anything meaningful about the data, such as identifying information and/or understandable details about the data. In some examples, the algorithm can be split among parties or portions or locations within a system D2 114 and who can jointly compute the algorithm, without either party learning about the entire algorithm. The technologies herein also provide a system and/or process for performing more complex operations on split data faster. The technologies herein also provide a system and/or process for hiding or encrypting a neural network, such as a convolutional neural network (CNN), from the data being operated on, with fewer network hops and faster complex mathematical computations which are used to coordinate the separate processing of the split data/algorithms in separate locations.

As shown in FIG. 2, the system 200 will encrypt the first product D2 114 and the second product A3 116 and then split them into different subsets. In another aspect, the system will split the first product D2 114 and the second product A3 116 and encrypt the different subsets D21 202, D22 204, A31 206, A32 208. Then the system processes different subsets of the first product subset D21 202 with a subset of the second product A31 206 in a compute environment 210. Another subset of the first product D22 204 is processed with another subset of the second product A32 208 in a second compute environment 212. The compute environments 210 and 212 can be separated or divided in a number of different ways. For example compute environments 210, 212 can be physically separated on different nodes within the system or may be configured in separate virtual machines which separate them. The different environments can be part of the same overall marketplace system or the different environments could be a first environment associated with a data provider and a second environment associated with an algorithm provider.

The first result R1 214 of the computing in the first compute environment 210 is output and the second result R2 216 is output from the second compute environment 212. These are combined into a final combined result RC 218 which can be provided to an intended recipient or both the first provider and second provider as well as others. The results are encrypted at some point in the processing. For example, R1 214 and R2 216 can be encrypted or not. The combined results RC 218 will be encrypted for security and delivered to the appropriate destination for decryption and viewing or for storage.

Figure 3A:
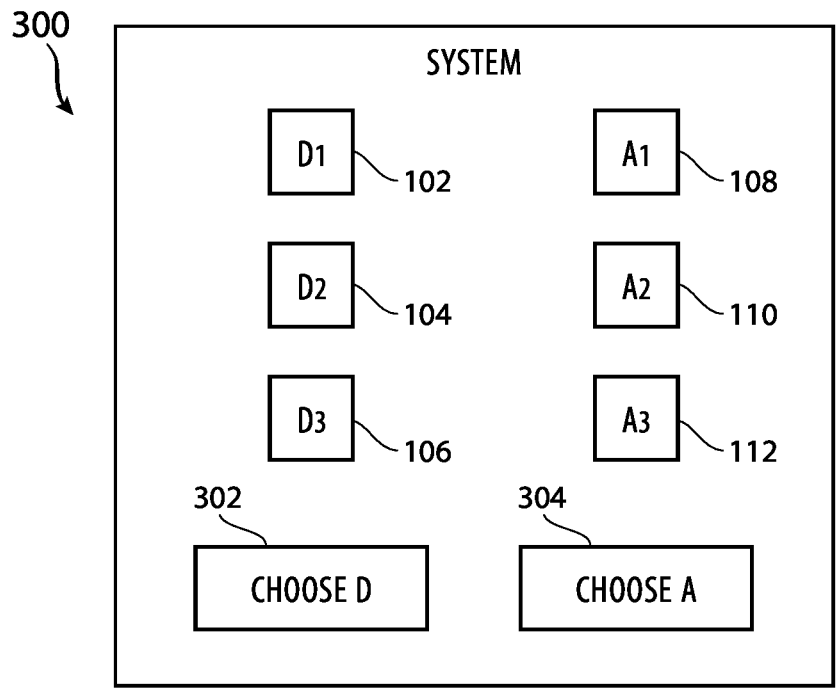
FIGS. 3A and 3B illustrate example user interfaces to selecting data and algorithms for processing.
Figure 3B:
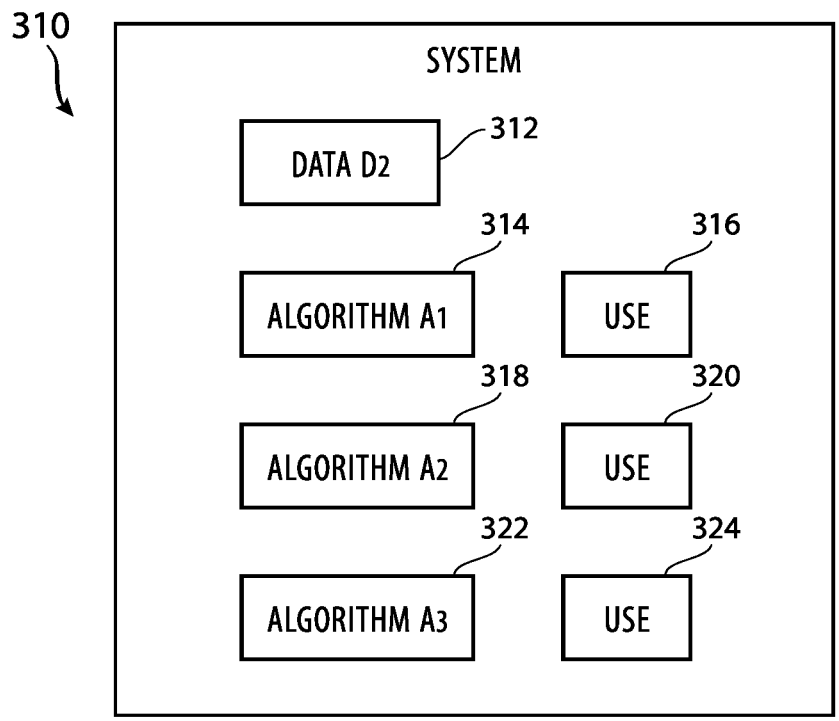

FIGS. 3A and 3B illustrate example user interfaces for improving the user experience in terms of the selection of different products that will interact such as data being processed by an algorithm. These processes are implemented as improvements to the current user interfaces for selecting such different components for interaction and processing.

As noted above, the company Amazon pioneered the use of one-click purchasing by storing the user's payment and address information on the website and configuring the interface such that as the user identifies a product that they desire to purchase, the user with one click of an object or button could both paying for the product and have it delivered to their home. The present disclosure extends this idea into a more complicated transaction but introduces new configurations in order to make the process easy of selecting a first component such as data and the selecting the second component such as an algorithm and then initiating the processing of the data using the algorithm in a simplified manner, as well as other optional functions associated with the transaction. The system is improved by introducing a more complicated set of operations to the "one-click" interaction such that one or more of the following operations occurs. A payment can be made, the system can initiate the processing of data using the identified algorithm, output data can be generated, and the output data can be transmitted to the appropriate recipient.

In the present case, it may be determined at which point one would start the counting of clicks or interactions for identifying whether the initiation of the processing is via "one-click", "two-clicks" and so forth. For example, in FIG. 3A, the user may navigate to a website such as www.data-algorithm-marketplace.com. The user may interact with the site to get to a certain state where one could start counting clicks. The interface 300 in FIG. 3A shows the state where various data items are available for selection D1 102, D2 104 D3 106 and various algorithm items are also available for selection A1 108, A2 110, A3 112. In this state, the system can present the user with an option to choose a data set 302 and then choose an algorithm 304. Other configuration settings could be stored in a profile for that user. In one example, once these two items are chosen in either order the system could then immediately and without further user interaction process the chosen data with the chosen algorithm using the encryption and splitting process disclosed herein. The recipient of the result should be also provided in a profile or requested by the system. In this regard, this interface can be deemed a "two-click" operation which makes the process more simple for the end user.

FIG. 3B illustrate the duration of this approach where the interface 310 may be configured such that the user searches through a database of data items and selects their chosen data 312. Next, the user reviews various algorithms for selection 314, 318, 322. Each algorithm can have associated "one-click" purchasing object 316, 320, 324. One difference between this approach in an Amazon.com "one-click" purchasing approach is that in this scenario is not simply a single product that needs to be purchased but there is a dependency between the data and the algorithm which is why in FIG. 3B, the earlier selection of the data 312 is presented. One can also consider FIG. 3B to be in a state where the chosen data is identified 312 and the rest of the screen is focused on a single selected algorithm with details for an overview of the operation of the algorithm, its costs, subscription time, and so forth. The user may need to enter some data in regarding whether to use the algorithm per hour, per project, or any other details regarding how the algorithm is to be used. The user may also choose the algorithm first and then identify the data to be processed second.

In this state, a "one-click" purchasing option can be presented. This purchasing option differs in a number of different ways from the Amazon.com processing. While the payment may be involved, upon clicking the "use" or "subscribe" or "lease" button 316 to select a particular algorithm, the system can automatically, and without further user interaction, cause one or more of the following steps to occur. The system can make a payment to the provider of the algorithm and/or the data. The payment is typically from the user but other payments could also be built into the processing triggered by the one click, such as payments from the data owner to the algorithm owner. The system can initiate the processing of the chosen data by the chosen algorithm in the manner disclosed herein with respect to generating subsets of the data with subsets of the algorithm and providing output result subsets which are then combined to generate or to yield a combined result. A user profile can be configured with "delivery" instructions regarding one or more entities that should receive the results and how those results should be delivered, such as via email, filed transfer, data subsets, encryption schemes, and so forth.

A user profile can also include other parameters or instructions regarding how the system should process the data using the algorithm. As one of the purposes of this disclosure is to enable the secure and confidential processing of the data such that the data provider and the algorithm provider will have no insight into each other's data or algorithm during processing. The particular manner or parameters that may be used to process the data can be built into a user profile. For example, the user profile may require a physical separation of the data subsets and the algorithm subsets as they perform the processing. In another aspect, the user profile may approve a virtual or logical separation of the processing, weights of variables or filters, or other such parameters.

FIGS. 3A and 3B illustrate an example user interfaces that represents the underlying configuration of the site. We note that other user interfaces are contemplated within this disclosure as well, such as spoken dialog interfaces, gesture based interfaces, multimodal interactions, touch screens, and so forth. There may be any number of different approaches to easily select a first component and the second component and then initiate a process of the components are interdependent in a simplified manner for the end user. As noted above, while the example provided herein primarily relates to data being processed by an algorithm, other computer items support components are also contemplated as within the scope of this disclosure. Thus, users may select, for example, player characteristics and a video game and initiate the use of the video game using the player characteristics according to the principles disclosed herein.

Figure 4:
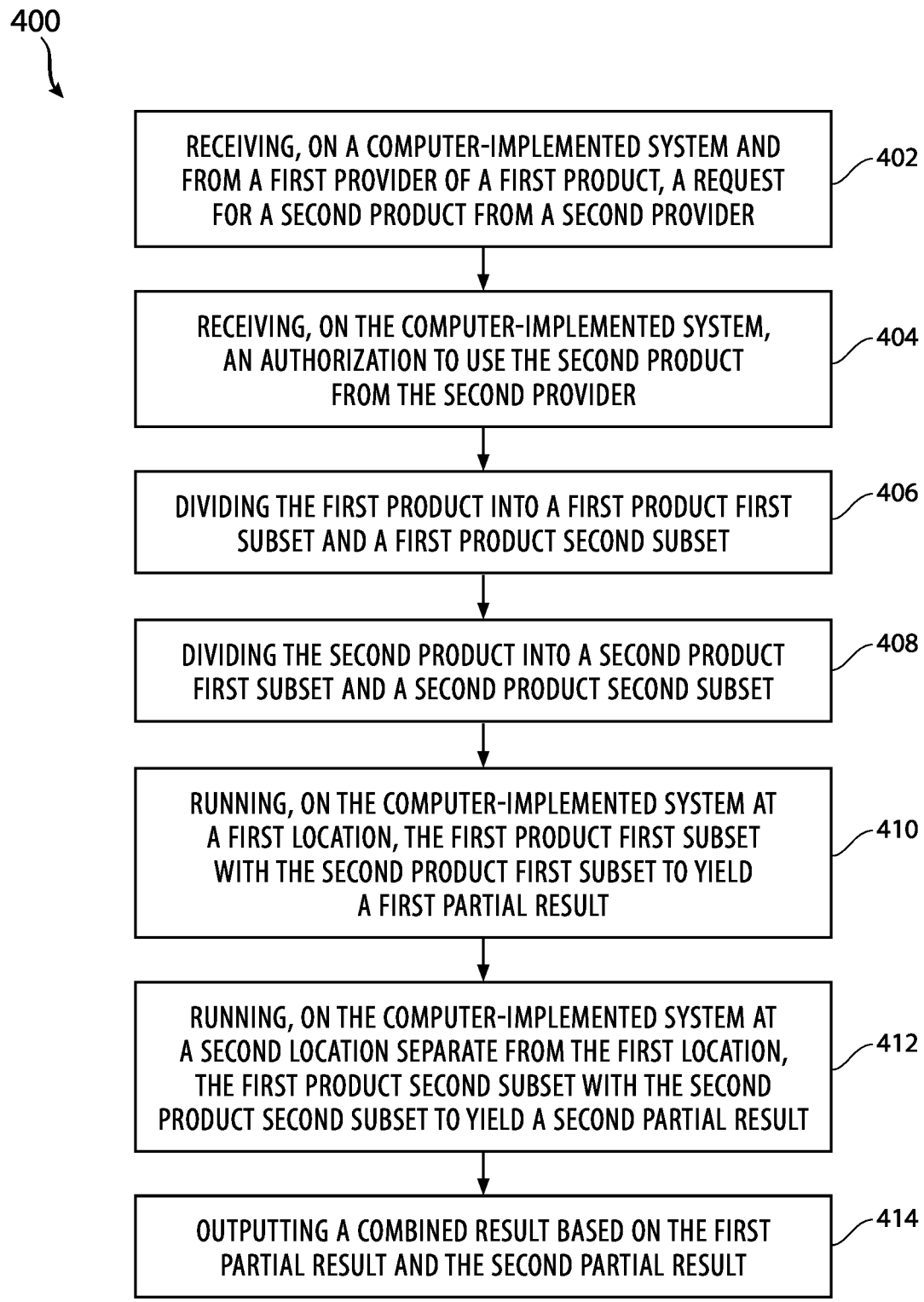
FIG. 4 illustrates a method embodiment.

FIG. 4 illustrates an example method of providing the system disclosed herein. An example method includes one or more of receiving, on a computer-implemented system and from a first provider of a first product, a request for a second product from a second provider (402), receiving, on the computer-implemented system, an authorization to use the second product from the second provider (404). Based on the authorization, the method can include additional steps including dividing the first product into a first product first subset and a first product second subset (406), dividing the second product into a second product first subset and a second product second subset (408), running, on the computer-implemented system at a first location, the first product first subset with the second product first subset to yield a first partial result (410), running, on the computer-implemented system at a second location separate from the first location, the first product second subset with the second product second subset to yield a second partial result (412) and outputting a combined result based on the first partial result and the second partial result (414). The authorization can be a "one-click", "two-click" or single function operation to initiate the processing and optional additional operations such as payment. These one or more steps can occur in any order.

The method of can further include establishing, based on the authorization which can be manual from the second provider or automated in some fashion, a contract between the first provider and the second provider. This can be done, for example, via a computing system, blockchain network including a plurality of distributed nodes running a distributed consensus algorithm for determining when appropriate steps have occurred and recording transactions on a distributed ledger.

In one aspect, the first product can be data and the second product can be an algorithm. Any two computer components, data or software that can interact, however, and can be processed according to these operations. For example, two databases could be blended, two algorithms could be combined, a game could be played with certain data, and so forth. The scope of the concepts disclosed herein is not limited to data being operated on by an algorithm.

The method of can further include designating an intended recipient of the combined result and/or only providing the combined result to the intended recipient. The person ordering the use of the algorithm with their data can, for example, be designated by the system as the only recipient. Both parties could also receive the data or metadata about the combined results. The parties may receive different information. For example, the owner of the algorithm may receive a confirmation of successful processing and that the recipient has the combined resulting data. The combined result can be encrypted and only decrypted by the intended recipient(s). One additional operation can be that the system destroys any copy of the data, partial result or combined result of the processing of the data by the algorithm.

In one aspect, upon the outputting of the combined result, a payment is processed from a recipient of the combined result to one of the first provider or the second provider. In this regard, the system can provide a computer implemented marketplace for users to upload algorithms, data, or other products for use in the marketplace in a manner that is secure.

In one aspect, the first location 210 can be separate from the second location 212 such that there is at least one of a physical computer-based separation or a virtual environment separation for distributing the processing of the different locations across a plurality of nodes on a network. The system can implement a secure separation between different nodes such that the first location 210 cannot access the processing or data from the second location 212 and vice versa. The system may also virtualize difference computing environments through virtual machines, containers, or any other implementations that enables separate processing environments to be created in a secure manner that they are unable to access the other environments.

For algorithms, there can be a hiding operation where the features of the algorithm can be hidden by converting the algorithm first into a Boolean logic gate set. That logic gate set can be divided into a first subset and a second subset. The Boolean logic gate set can include at least one of AND gates and/or XOR gates.

In this manner, the system can provide an environment in which the user can select a first product such as data and request processing the data on a second product such as an algorithm, wherein the system can present the party owning the algorithm with the request for authorization to use of the algorithm, and then upon the proper authorization, implement the steps described herein for processing the selected data using the selected algorithm in encrypted environment. The system can be called, in one example, encrypted marketplace which enables a quick and easy user interface for identifying the first product and the second product, obtaining the proper authorizations, initiating the processing of the first product using the second product in a one click processing/purchase context.

The method can also include encrypting, on the computer-implemented system, the first product first subset and the first product second subset, encrypting, on the computer-implemented system, the second product first subset and the second product second subset and encrypting, on the computer-implemented system, the combined result. The receiving of the request and the receiving of the authorization can include a one or two-click affirmation process for establishing a contract between the first provider and the second provider to generate the combined data.

The system does not have to require a one-to-one relationship between the first product (i.e., an algorithm) and the second product (i.e., data). An algorithm may use two or more datasets from the marketplace. Two or more algorithms can be strung together to operate upon one, two or more datasets as well.

Figure 5:
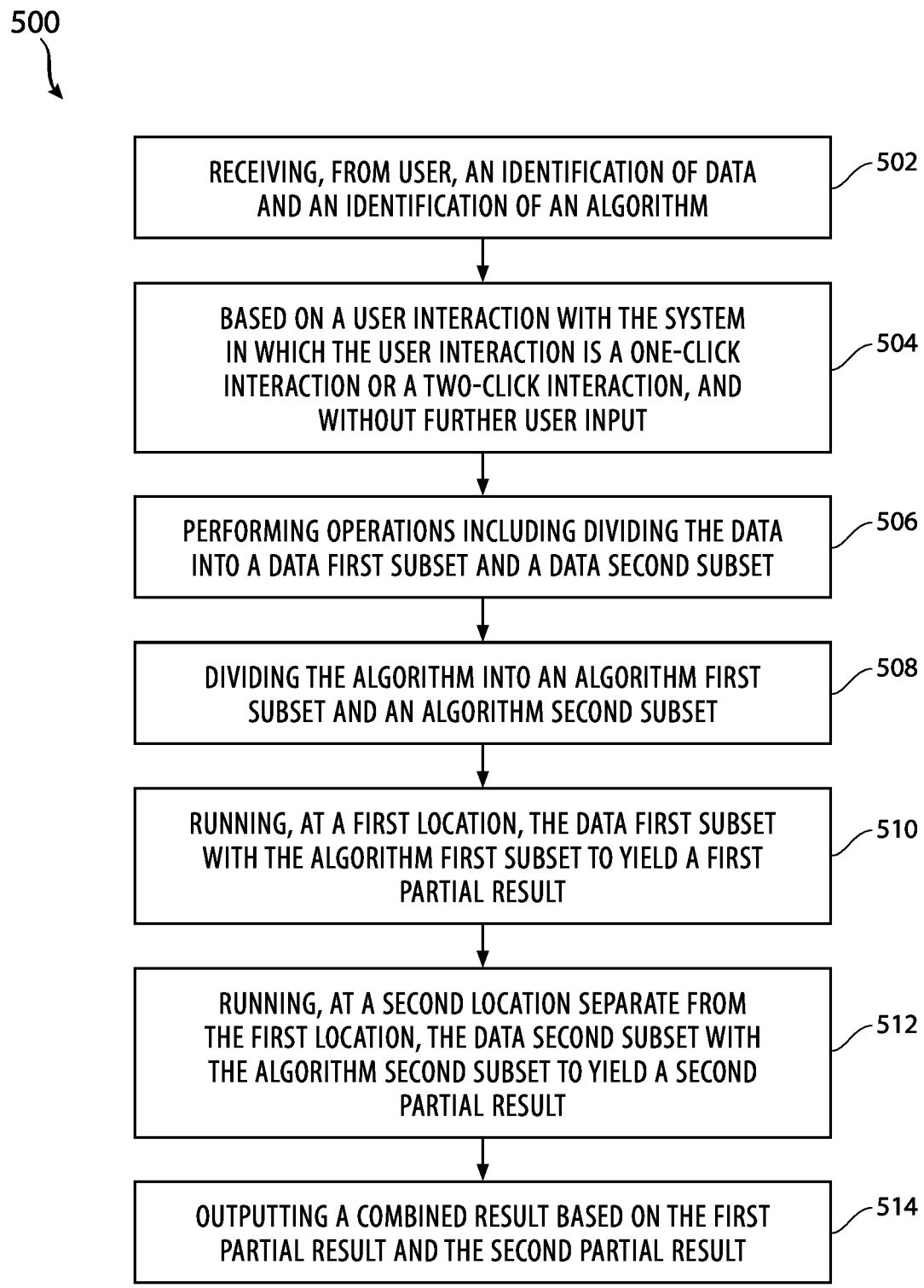
FIG. 5 illustrates another method embodiment.

FIG. 5 illustrates another method embodiment with respect to the use of a one-click or a two-click interaction in order to initiate the processing one component by another component. An method includes receiving, on a computer-implemented system and from a user, an identification of data and an identification of an algorithm (502) and, based on a user interaction with the computer-implemented system in which the user interaction is a one-click interaction or a two-click interaction, and without further user input (504), performing operations including dividing the data into a data first subset and a data second subset (506), dividing the algorithm (or a Boolean logic gate representation of the algorithm) into an algorithm first subset and an algorithm second subset (508), running, on the computer-implemented system at a first location, the data first subset with the algorithm first subset to yield a first partial result (510), running, on the computer-implemented system at a second location separate from the first location, the data second subset with the algorithm second subset to yield a second partial result (512) and outputting a combined result based on the first partial result and the second partial result (514). One or more of these operations can be performed in any order. User profile data or stored parameters can also guide or direct how the processing of the data with the algorithm might occur. Again, this disclosure notes that when one starts counting clicks is typically after the item for use or purchase is chosen or when the user has selected the items (data plus algorithm) and is ready to initiate the processing or where an item or items that the user desires to use is being presented on a user interface for selection. The selection process is simplified to both select an item (say, the algorithm to operate on the previously chosen data) and initiate the appropriate process using the item in coordination with a separate item such as data. The concept of a "one-click" action is also meant to cover a single function, single gesture, or single action like providing a fingerprint or facial recognition action to authorize or initiate the further processing. Thus, it may not literally be a "click" of an object on a display screen.

The algorithm that is divided can first be converted to a Boolean logic gate set. The Boolean logic gate set can then be divided into subsets of Boolean logic gates for further processing as disclosed herein. Then, when this disclosure references dividing the "algorithm", one aspect of that concept includes dividing a Boolean logic gate set representation of the algorithm into two logic gate subsets. Other objects can be divided as well such as images or other modules or digital assets.

Figure 6:
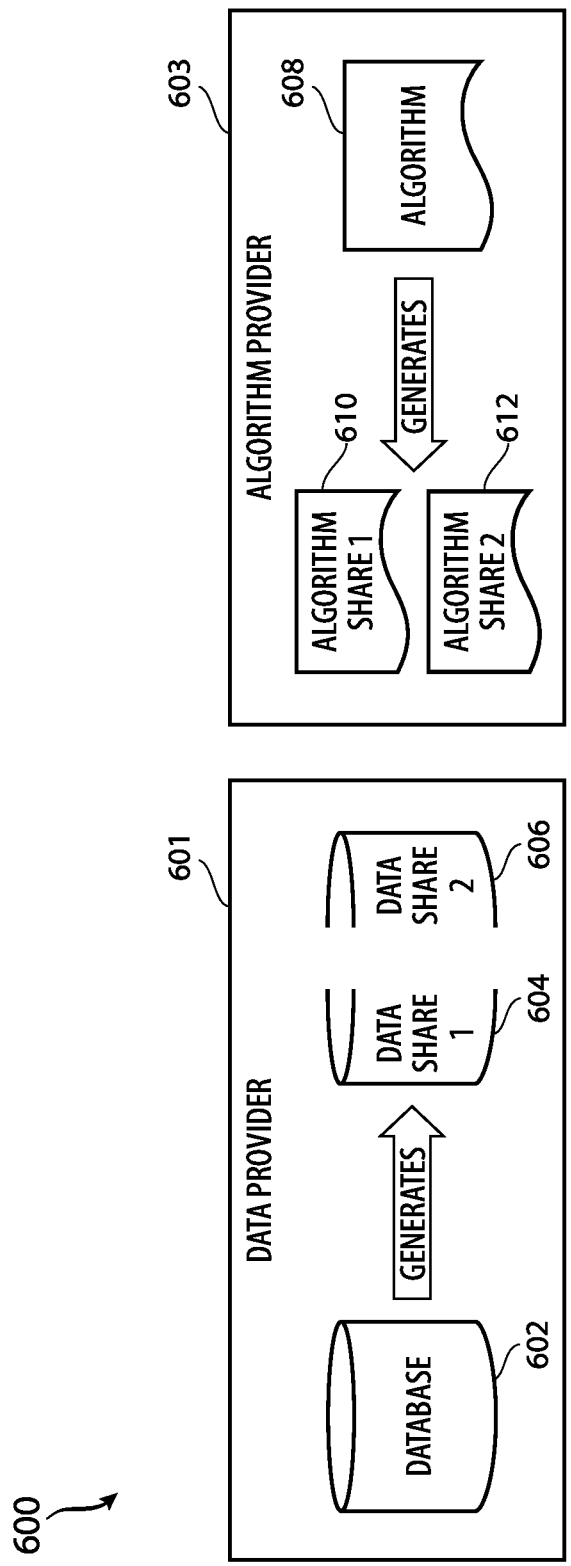
FIG. 6 illustrates the data provider dividing data and the algorithm provider dividing an algorithm, in accordance with various embodiments.
Figure 7:
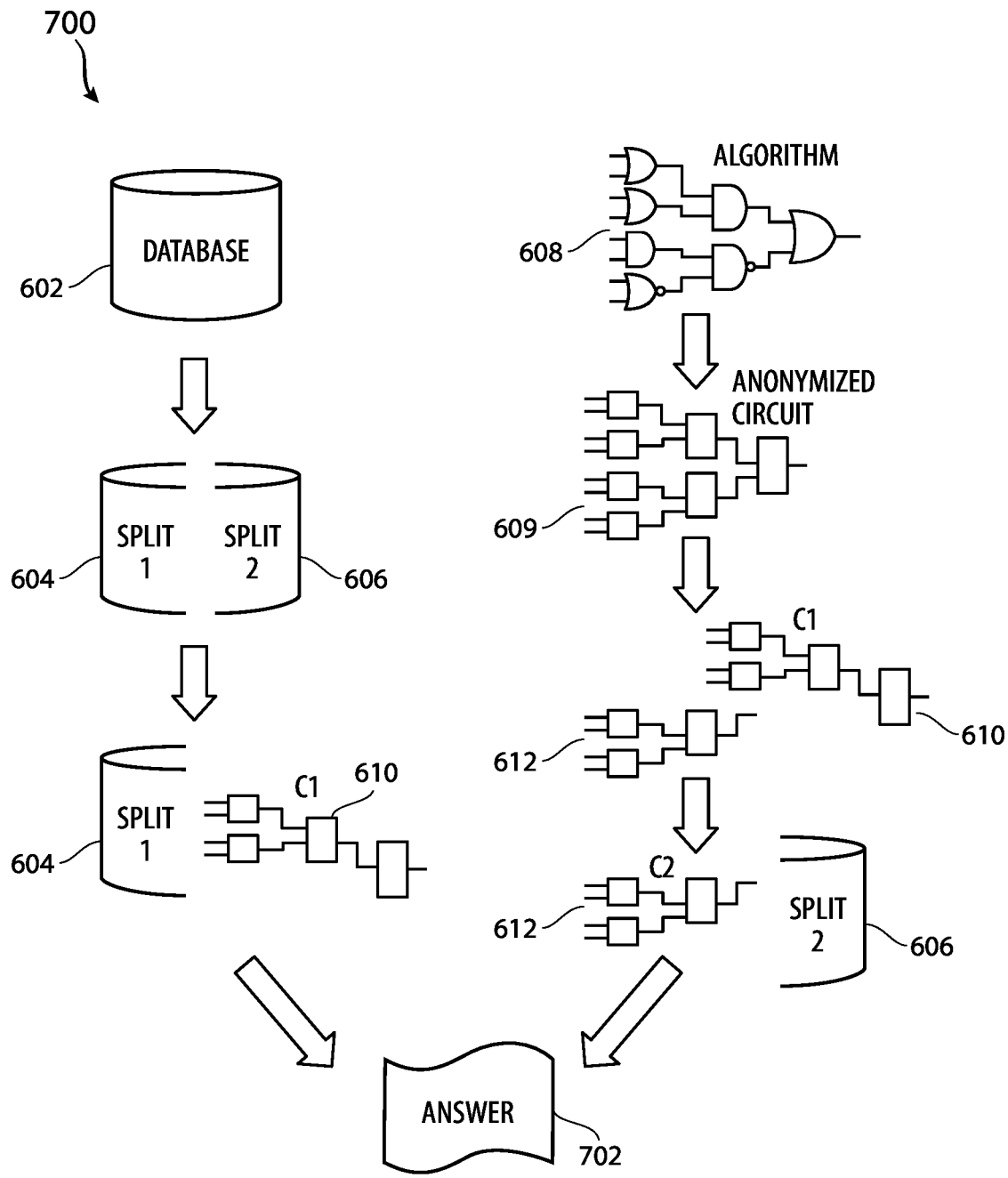
FIG. 7 illustrates the data provider and the algorithm provider jointly computing an algorithm, in accordance with various embodiments.

The patent applications incorporated herein by reference include many details about the processing of the data and the algorithms, including approaches to increasing computational efficiency on the split data and split algorithms and using neural networks. FIGS. 6 and 7 illustrate some of the main features of these processes. Any of the further technical details regarding how data is processed by the algorithm in a secure and private way from the related applications can be incorporated or used in connection with the processing. A higher level description of concept of using data subsets and algorithm subsets is provided herein.

FIG. 6 illustrates the data provider computing device 601 dividing the data and the algorithm provider computing device 603 dividing the algorithm to setup a secure multi-party computation approach, in accordance with various embodiments. As shown in FIG. 6, the data provider computing device 601 can retrieve the data from a database 602 and perform an operation to divide the data into a first subset or first share 604 and a second subset or second share 606. In addition, as shown in FIG. 6, the algorithm provider computing device 603 may obtain the algorithm 608 and perform an operation to divide the algorithm 608 into a first subset or first algorithm 610 and a second subset or second algorithm 612. In one example, the algorithm is converted into a Boolean logic gate set 608. The logic gate set is then divided into a first subset and a second subset of the algorithm. A computing device can perform operations by reducing computer-readable instructions into binary decisions or Boolean logic operations or gates. Thus, the data provider computing device 601 and the algorithm provider computing device 603 may reduce the data and/or the algorithm into an emulated circuit or virtualized circuit that represents the data and/or the algorithm and can anonymize the circuit. In another example, the circuit may be represented by hardware.

As an example, the first subset of data and the second subset of data may be a nonsensical split of data. In addition, the first subset of the algorithm 610 and the second subset of the algorithm 612 may be a nonsensical split. The two parties (or two different computing environments) may operate on their respective splits of the algorithm. Neither party executes the entire algorithm on the entire set of data and does not understand what the entire algorithm determines. The splitting of the data and/or the splitting of the algorithm can occur on any of the components disclosed herein. For example, an entity might provide programming to a data provider 601 which can preprocess or prepare the data in terms of one or more of encryption and data splitting before the data is transmitted to the entity such as an aggregator/marketplace. The aggregator or marketplace might simply receive the data and perform the encryption and splitting on its compute systems as well. Similar processes can occur for the algorithm provider 603. Details about example aggregators is found in the related applications incorporated herein by reference.

FIG. 7 illustrates a computing device processing the algorithm 608 and the data 602, in accordance with various embodiments. As an example, the database 602 may be divided into the first subset of data 604 and the second subset of data 606. In addition, the algorithm 608 (or a Boolean logic gate set representation of the algorithm) may be converted into an anonymized circuit and then divided into a first subset of the algorithm 610 and a second subset of the algorithm 612. The data provider computing device 102 may send the second subset of data to the algorithm provider computing device 603 or to an aggregator. The algorithm provider computing device 603 may send the first subset of the algorithm 610 to the data provider computing device 601 or to the aggregator. The data provider computing device 601 or the aggregator may perform the first subset of the algorithm 610 on the first subset of data 604. In addition, the algorithm provider computing device 603 or the aggregator may perform the second subset of the algorithm 612 on the second subset of data 606. The data provider computing device 601 and the algorithm provider computing device 603 (or the aggregator) may merge their partial results together to form a final result or answer 702. The aggregator in this instance could be system 100 that runs a marketplace where data and algorithms can be accessed/chosen/purchased/uploaded and then accessed for processing.

In some examples, systems, methods, and computer-readable media are described for encrypting data, algorithms, neural networks, and other information and performing complex operations on split or encrypted data accurately and more efficiently. As noted above, various approaches and further details about how the data and algorithms are split and processed are found in the related applications and incorporated herein by reference.

In another aspect, the method can apply to data that is homomorphically encrypted and manipulated by a standard (unencrypted) algorithm. The data and the algorithm can be securely executed within a trusted execution environment or secure enclave. Examples of secure enclaves can be, for example and not by way of limitation, hardware-based environments like Qualcomm TZ, Intel SGX, etc., or a software emulated environment like V-Key's V-OS.

Figure 8:
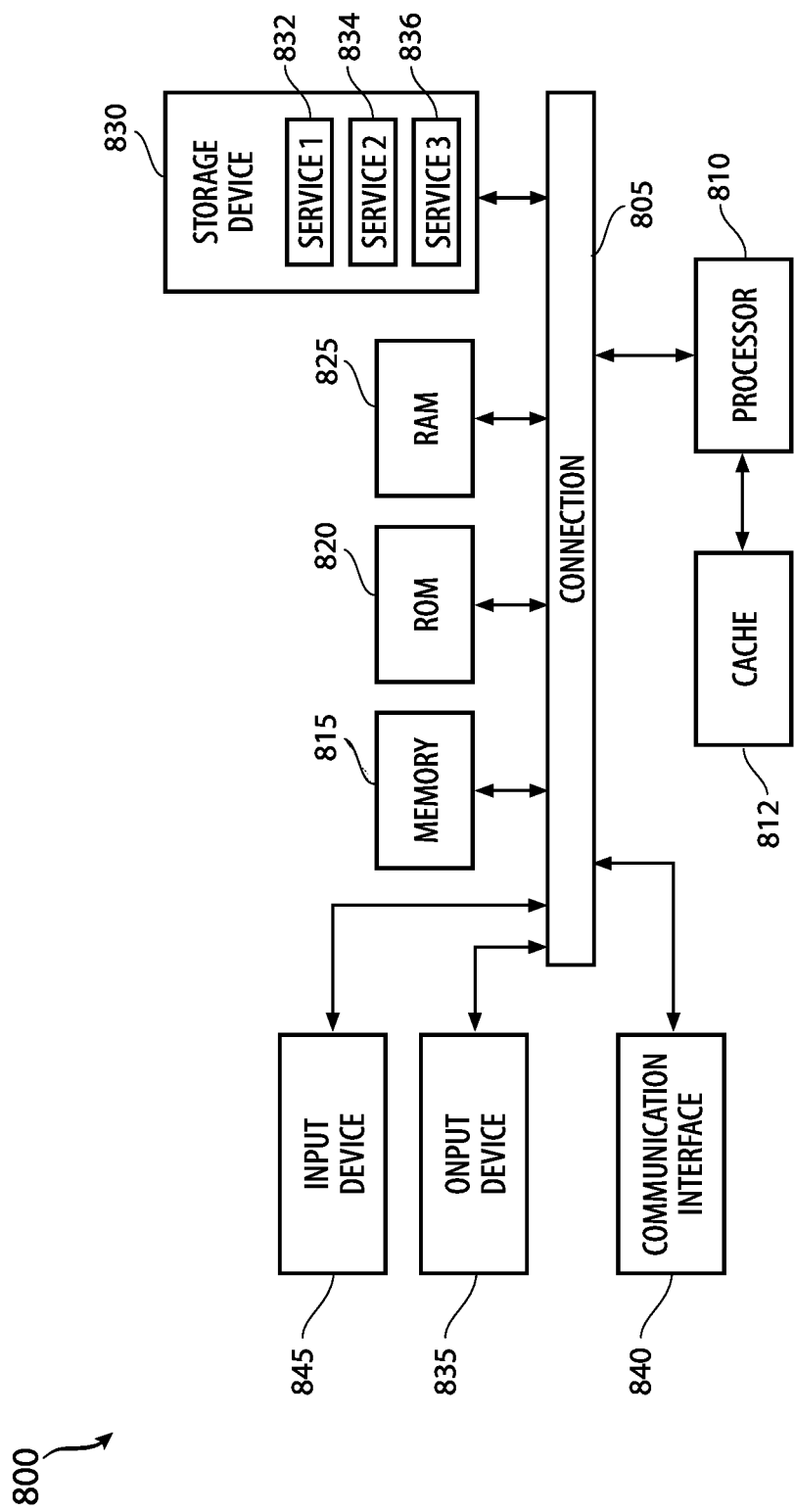
FIG. 8 illustrates an example system.

FIG. 8 illustrates an example computing system architecture of a system 800 which can be used to process data operations and requests, store data content and/or metadata, and perform other computing operations. In this example, the components of the system 800 are in electrical communication with each other using a connection 805, such as a bus. The system 800 includes a processing unit (CPU or processor) 810 and a connection 805 that couples various system components including a memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to cache 812 for quick access by the processor 810. In this way, the cache can provide a performance boost that avoids processor 810 delays while waiting for data. These and other modules can control or be configured to control the processor 810 to perform various actions. Other memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The computer-readable medium may include memory or data storage media, such as non-volatile random access memory (NVRAM), electrically erasable programmable read-only memory (EEPROM), FLASH memory, magnetic or optical data storage media, and the like.

The storage device 830 can include services 832, 834, 836 for controlling the processor 810. Other hardware or software modules are contemplated. The storage device 830 can be connected to the connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. A computer system programmed with the algorithms disclosed herein or incorporated herein by reference are a special-purpose computer system according to Patent Office Guidance. The computer executable instructions may be, for example, binaries, intermediate format instructions such as assembly language, firmware, or source code.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, on a third computer-implemented system, an identification of a first product;
   receiving, on the third computer-implemented system, a request for use of a second product;
   receiving, on the third computer-implemented system, an authorization from a provider of the second product to use the second product; and
   based on the authorization:
      dividing, on the third computer-implemented system, the first product into a first product first subset and a first product second subset;
      converting, on the third computer-implemented system, the first product first subset into a first Boolean logic gate set;
      converting, on the third computer-implemented system, the first product second subset into a second Boolean logic gate set;
      dividing, on the third computer-implemented system, the second product into a second product first subset and a second product second subset;
      transmitting, from the third computer-implemented system to a first computer-implemented system, the first Boolean logic gate set;
      transmitting, from the third computer-implemented system to a second computer-implemented system, the second Boolean logic gate set, wherein the first computer-implemented system is separate physically or virtually from the second computer-implemented system;
      running, on the first computer-implemented system, the first Boolean logic gate set with the second product first subset to yield a first partial result;
      running, on the second computer-implemented system, the first the second Boolean logic gate set with the second product second subset to yield a second partial result, wherein the running, on the second computer-implemented system, of the second Boolean logic gate set with the second product second subset to yield the second partial result maintains privacy between the first product and the second product;
      outputting, from the third computer-implemented system, a combined result based on the first partial result and the second partial result.

2. The method of claim 1, further comprising:
   establishing, based on the authorization, a contract between the first provider computer system and the second provider computer system.

3. The method of claim 1, wherein the first product comprises data and the second product comprises an algorithm.

4. The method of claim 1, further comprising:
   designating an intended recipient of the combined result.

5. The method of claim 4, further comprising:
   only providing the combined result to the intended recipient.

6. The method of claim 1, wherein the receiving of the authorization to use the second product from the second provider computer system is performed via a one-click or two-click operation.

7. The method of claim 2, wherein upon the outputting of the combined result, a payment is processed from a recipient of the combined result to one of the first provider computer system or the second provider computer system.

8. The method of claim 1, wherein the first provider computer system receives the combined result and provides a payment to the second provider computer system.

9. The method of claim 1, wherein the first Boolean logic gate set and the second Boolean logic gate set comprise AND gates and XOR gates.

10. The method of claim 1, further comprising:
    sending the combined result to the first provider computer system and displaying a representation of the combined result.

11. The method of claim 1, further comprising:
    sending the combined result to the second provider computer system and displaying a representation of the combined result.

12. The method of claim 1, wherein the second product is selected from a list of products provided by the second provider computer system.

13. The method of claim 1, wherein the first product is retrieved by the first provider computer system from a database.

14. The method of claim 1, further comprising:
    encrypting, on the computer-implemented system, the first product first subset and the first product second subset;
    encrypting, on the computer-implemented system, the second product first subset and the second product second subset; and
    encrypting, on the computer-implemented system, the combined result.

15. The method of claim 1, wherein the receiving of the request and the receiving of the authorization comprises a one-click or a two-click authorization process for establishing a contract between the first provider computer system and the second provider computer system to generate the combined result.

16. A system comprising:
    a first computer-implemented system comprising a first processor and a first memory storing first instructions;
    a second computer-implemented system comprising a second processor and a second memory storing second instructions; and a third computer-implemented system comprising at least one third processor and a third memory, wherein: the third memory stores third instructions which, when executed by the at least one third processor, cause the at least one third processor to perform operations comprising:
receiving an identification of a first product;
receiving, a request for a use of second product;
receiving, from a provider of the second product, an authorization to use the second product; and
based on the authorization:
dividing the first product into a first product first subset and a first product second subset;
converting the first product first subset into a first Boolean logic gate set;
converting the first product second subset into a second Boolean logic gate set;
dividing the second product into a second product first subset and a second product second subset;
transmitting, to the first computer-implemented system, the first Boolean logic gate set; and
transmitting, to the second computer-implemented system, the second Boolean logic gate set, wherein the first computer-implemented system is separate physically or virtually from the second computer-implemented system;
the first instructions, when executed by the first processor, cause the first processor to perform operations comprising:
running, on the first computer-implemented system, the first Boolean logic gate set with the second product first subset to yield a first partial result;
the second instructions, when executed by the second processor, cause the second processor to perform operations comprising:
running, on the second computer-implemented system, the the second Boolean logic gate set with the second product second subset to yield a second partial result, wherein the running, on the second computer-implemented system, of the second Boolean logic gate set with the second product second subset to yield the second partial result maintains privacy between the first product and the second product; and
the third instructions, when executed by the at least one third processor, cause the at least one third processor to perform operations comprising:
outputting a combined result based on the first partial result and the second partial result.

17. The system of claim 16, wherein the computer-readable medium stores further instructions which, when executed by the at least one processor, cause the at least one processor to perform operations comprising:
encrypting the first product first subset and the first product second subset;
encrypting the second product first subset and the second product second subset; and
encrypting the combined result.

* * * * *